(12) United States Patent
Shakespear

(10) Patent No.: US 6,752,233 B1
(45) Date of Patent: Jun. 22, 2004

(54) SELECTABLE OVERSPEED SECONDARY DRIVE MODULE

(75) Inventor: Daniel Shakespear, Eppstein (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/364,204

(22) Filed: Feb. 11, 2003

(51) Int. Cl.[7] .............................................. B60K 17/35
(52) U.S. Cl. ...................................... 180/248; 475/198
(58) Field of Search ................................ 180/249, 248; 475/198, 218, 207, 206

(56) References Cited

U.S. PATENT DOCUMENTS

| | | | |
|---|---|---|---|
| 4,605,087 A | | 8/1986 | Ashauer et al. ............. 180/248 |
| 4,848,508 A | | 7/1989 | Smirl et al. .................. 180/248 |
| 4,926,329 A | | 5/1990 | Stelter et al. .......... 364/424.01 |
| 4,961,476 A | | 10/1990 | Witte et al. ................. 180/197 |
| 4,989,686 A | | 2/1991 | Miller et al. ................ 180/197 |
| 5,251,719 A | * | 10/1993 | Eto et al. ..................... 180/197 |
| 5,334,116 A | * | 8/1994 | Baxter, Jr. ................... 475/204 |
| 5,335,746 A | * | 8/1994 | Betz ............................ 180/248 |
| 5,396,421 A | * | 3/1995 | Niikura et al. ................ 701/69 |
| 5,448,478 A | * | 9/1995 | Eto .............................. 701/69 |
| 5,954,778 A | * | 9/1999 | Rodrigues et al. ............ 701/69 |
| 6,428,439 B1 | | 8/2002 | Gassmann .................... 475/84 |

* cited by examiner

*Primary Examiner*—Lesley D. Morris
*Assistant Examiner*—Tony Winner
(74) *Attorney, Agent, or Firm*—Laura C. Hargitt

(57) ABSTRACT

A vehicle drive system includes a primary axle driven by torque from a transmission, an output shaft or propeller shaft driven by the primary axle or transmission, a secondary axle, a secondary axle clutch, and a secondary axle drive module. The secondary axle clutch is configured to operatively connect the secondary axle with the output shaft. The secondary axle drive module is operatively connected between the output shaft and secondary axle. The drive module includes an overspeed gear set connected in parallel with a one-way clutch to facilitate application of torque to the secondary axle even when the secondary axle is rotating faster than the primary axle.

20 Claims, 3 Drawing Sheets

SELECTABLE OVERSPEED SECONDARY DRIVE MODULE

TECHNICAL FIELD

The present invention relates to a drive system including a secondary axle drive module which is selectively engageable to create an overspeed condition wherein torque may be transferred to the secondary axle even when the secondary axle is rotating faster than the primary axle.

BACKGROUND OF THE INVENTION

Vehicle drive lines typically require a torque path to each driven wheel, which is usually a propeller shaft from a power take-off or transmission to a differential, which distributes power to the wheels on each axle. For acceptable steering and efficiency, a vehicle drive line must allow each wheel speed to be different. In normal vehicles with only the front wheels steered, each wheel follows a different path in cornering, with a different radius. This relationship is illustrated in FIG. 1. As shown, each wheel follows a different radial path.

If two wheels on an axle are to rotate at minimal slip, they cannot be coupled in such a way that they must be rotate at the same speed. An axle differential provides power to both wheels while allowing them to rotate at different speeds. If both axles are to be powered, then the average axle speed differences must also be considered. Since the front wheels follow a larger average radius than the rear wheels, locking the axles together results in slip while turning. This is particularly problematic on surfaces having a high frictional coefficient ($\mu$), such as asphalt or concrete. Operating a vehicle with axles locked together on a high ($\mu$) surface results in unacceptable binding and steering reactions, along with substantial drive line and tire wear. Thus, vehicles that must power both axles in such conditions require a center device that sends power to both axles while allowing variation in speed (such as with a differential or coupling).

Typical prior art drive line arrangements include two wheel drive (traditional front or rear wheel drive), part-time four wheel drive, permanent four wheel drive (all-wheel drive) with center differential, and permanent four wheel drive (all-wheel drive) with coupling. These systems have their advantages and disadvantages, but a standard limitation is that these systems do not allow full torque to be applied to the secondary axle when it is spinning faster than the primary axle when both are on surfaces with similar ($\mu$). In the case of an all-wheel drive (AWD) vehicle with a center coupling, the front/rear torque distribution split is limited by the load distribution of the vehicle.

It would be desirable to provide a drive system which enables complete front/rear torque control, independently of axle speeds.

SUMMARY OF THE INVENTION

The present invention provides a vehicle drive system which allows torque to be selectively applied to a secondary axle under a wider range of wheel speed conditions than is possible with prior art four wheel drive system, while retaining the, capability of efficient torque transfer under nominal conditions, i.e. when wheel speeds are nearly equal. The drive system of the invention allows torque to be applied to the secondary axle even when the secondary axle is spinning faster than the primary axle, thus enabling greater range of torque split between the front and rear axles.

More specifically, the invention provides a vehicle drive system including a primary axle driven by torque from a transmission, an output shaft driven by the primary axle or transmission, a secondary axle, a secondary axle clutch configured to operatively connect the secondary axle with the output shaft, and a secondary axle drive module. The secondary axle drive module is operatively connected between the output shaft and the secondary axle. The secondary axle drive module includes an overspeed gear set connected in parallel with a one-way clutch to facilitate application of torque to the secondary axle even when the secondary axle is rotating faster than the primary axle.

The overspeed gear set is selectively engageable with the secondary axle through an overspeed clutch. A secondary axle differential is operatively engaged between the secondary axle drive module and the secondary axle.

An angle gear set is operatively connected between the output shaft and the drive module. The overspeed gear set includes first and second intermeshed gears forming a first subset, and third and fourth intermeshed gears forming a second subset, wherein the first gear is connected to the angle gear set, the second gear is affixed to the third gear, and the fourth gear is selectively engageable with the secondary axle through an overspeed clutch. The first, second, third and fourth gears are sized and arranged so that the fourth gear rotates faster than the first gear.

The angle gear set, drive module, and secondary clutch may be arranged in any order sequentially in the torque flow path between the output shaft and secondary axle.

The secondary axle drive module enables torque distribution adjustment between 100% primary axle drive and 100% secondary axle drive. The overspeed gear set is configured to selectively rotate the secondary axle approximately 20% faster than the primary axle.

In an alternative embodiment, left and right clutches are provided on the secondary axle to selectively engage and disengage left and right wheels to allow control of the torque split side to side at the secondary axle.

The above, objects, features, advantages, and other objects, features, and advantages of the present invention are readily apparent from the following detailed description for the best modes for carrying out the invention when taken in connection with the accompanying drawings.

DESCRIPTION OF THE PREFERRED EMBODIMENTS

Supporting Disclosure Regarding Drive Trains

As used herein, ($\mu$) is the frictional coefficient of an interface. It is the ratio of the frictional force developed parallel to the interface surface, here referred to as $F_L$, to the force normal to the interface, here referred to $F_N$. Two values of ($\mu$) are normally discussed: a peak ($\mu$), which is the ratio of the highest $F_L$ that can be reacted before the objects move relative to each other, divided by $F_N$, and a sliding ($\mu$), which is the ratio of $F_L$ developed once the objects are moving relative to each other which opposes the motion, divided by $F_N$. The value of ($\mu$) typically depends on the velocity across the interface and a number of other factors.

Figure 1:
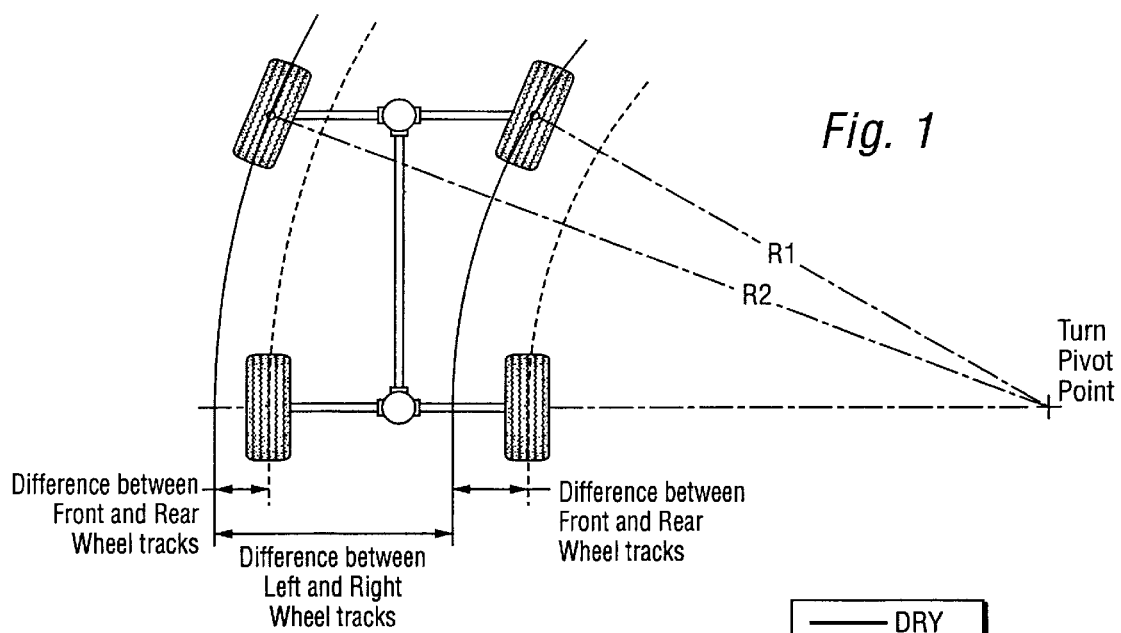
FIG. 1 shows a schematic overhead plan view of the front and rear wheels and axles on a vehicle illustrating the path followed by each wheel in a turn.
Figure 2:
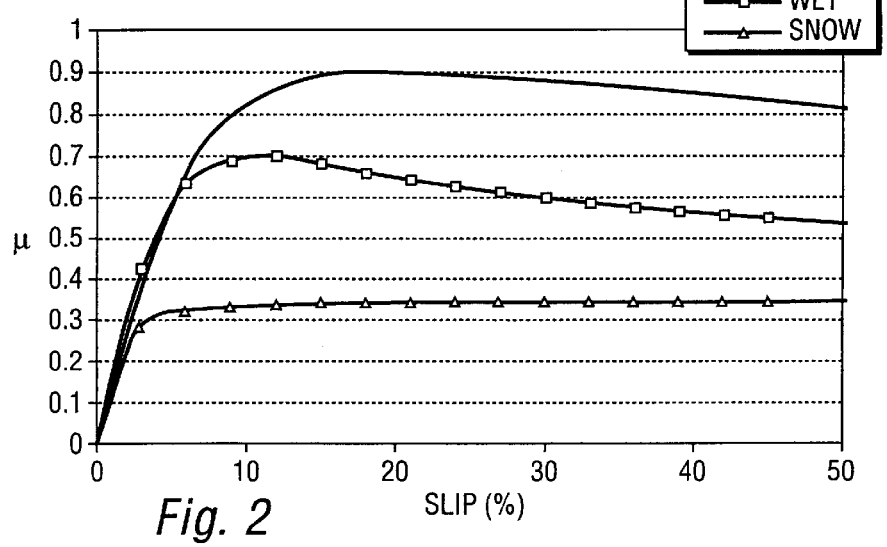
FIG. 2 shows a graphical illustration of various sample ($\mu$) slip curves.

In the case of a tire-road interface, the tire is deformable. When a road wheel rolls freely, i.e. without any applied braking or driving torque, the free-rolling radius, r, can be measured. It is simply the ratio of the longitudinal velocity of the wheel center to the radial velocity of the wheel (note that due to the deformability of the tire, it is not equal to the measured radius of the tire, or the distance from the wheel center to the ground). When a torque is applied to a rolling wheel and reacted at the road as $F_L$, the ratio of longitudinal velocity to radial velocity changes. This new ratio can be expressed as $r_E$, or effective rolling radius. The term slip denoted by i is defined by $i=(1-r_E/r)*100\%$. This expresses in a percentage how much faster or slower the tire is spinning under the influence of torque, compared to its free-rolling rotational speed. Since the tire is deformable, slip is required for it to develop force. The $F_L$ developed, divided by $F_N$, is the frictional coefficient, ($\mu$), for the given tire-road interface. Some typical relationships between slip and ($\mu$) are illustrated in FIG. 2.

Figure 3:
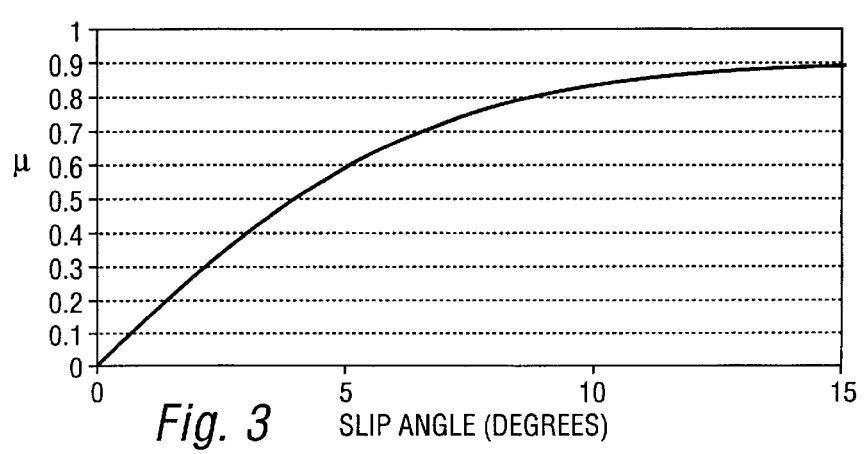
FIG. 3 shows a graphical illustration of a sample lateral ($\mu$) slip angle curve.

As the longitudinal force of a tire is related to the longitudinal slip, the lateral forces are related to the lateral slip. This is normally measured relative to the slip angle, that is, the angle between the direction of the free-rolling wheel (perpendicular to the wheel axis), and the actual direction of travel of the wheel center. One typical relationship between ($\mu$) and slip angle is shown in FIG. 3.

Figure 4:
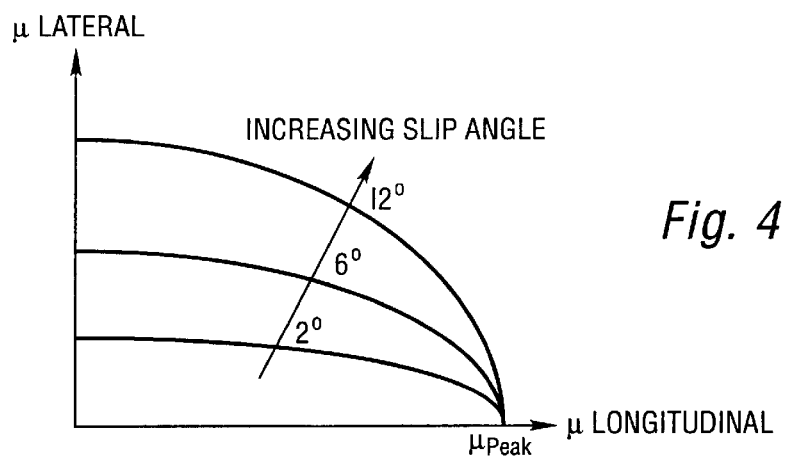
FIG. 4 shows a graphical illustration of the interaction between lateral and longitudinal loads.

Since the longitudinal and lateral forces of a tire are developed through the same frictional interface, there is interaction between them. As a tire develops greater longitudinal force, the lateral force for a given slip angle is reduced. This means that, to develop a constant lateral force, the tire must develop a greater slip angle. This can be seen in the graphic of FIG. 4, which shows the lateral ($\mu$) developed at a set of constant slip angles, for a range of longitudinal ($\mu$).

When a two wheel drive vehicle is traveling around a curve, and torque is applied to one axle, that axle will slip more laterally. In the case of front wheel drive, there is a tendency for the vehicle to understeer, since the additional slip angle at the front axle results in an increasing turn radius. In the case of rear wheel drive, there is a tendency for the vehicle to oversteer, since the increased slip angle at the rear results in decreasing turn radius (note that many other factors affect understeer and oversteer, the preceding is only a description of the influence of drive torque).

In a two wheel drive vehicle, both front wheel drive and rear wheel drive arrangements are limited in the net drive force that can be developed. For a given ($\mu$), the limit is something less than $(\mu)*F_{NF}$ for front wheel drive or $(\mu)*F_{NR}$ for rear wheel drive. $F_{NF}$ and $F_{NR}$ are the instantaneous normal loads on the front and rear axle, respectively. This is largely controlled by the weight distribution and affected by acceleration (which transfers load to the rear axle) road slope, etc. Typically, the drive axle of a two wheel drive vehicle will carry 50% to 63% of the vehicle's weight, so the vehicle is able to use about half of the available grip for accelerating. In the case of cornering, the amount of $(\mu)*F_{NF}$ or $(\mu)*F_{NR}$ used for driving force must be limited further, to leave some lateral force capability at the drive axle.

In four wheel drive or all wheel drive systems, greater drive torque can be applied to the road surface. Since both axles are powered, the theoretical net drive force is $(\mu)*(F_{NF}+F_{NR})$ and the vehicle is able to use nearly all of the available grip to accelerate or climb (as opposed to roughly half in a two wheel drive vehicle). Conversely, at a given drive force condition, the slip at the wheels will be roughly half of what would be required with two wheel drive, so there is more lateral grip available to maintain stability.

The preceding is particularly noticeable on low ($\mu$) surfaces. With a sufficiently high power/weight ratio, powering both axles can provide enough extra force to generate higher acceleration on high ($\mu$) surfaces, despite the added weight and frictional loss of the all wheel drive system.

Since less longitudinal slip is required to generate a given acceleration in four wheel drive or all wheel drive systems, there is less loss of lateral grip and thus less tendency to understeer or oversteer than a front wheel drive or rear wheel drive vehicle. More longitudinal acceleration is possible at a given lateral acceleration, i.e. the limit of acceleration while maintaining a curved path is higher. This advantage is noticeable and useful even in low power cars on wet roads, in conditions such as turns at an intersection and accelerating on a merge ramp.

Further advantages of being able to control fore/aft torque distribution include the ability to react to differing fore/aft grip and improved vehicle yaw response. In differing fore/aft grip conditions, torque can be diverted from the axle with less grip to the axle with more grip for greater acceleration and stability. This is normally the goal of speed and torque sensitive couplings which transfer torque to the slower speed axle, and is attained in active couplings by reactive control. Regarding improved yaw response, vehicle initial turn-in can be improved by transferring torque rearward, and understeer or oversteer can be corrected by shifting torque forward or rearward. Since the axle that should receive torque is not necessarily the slower spinning axle, these effects can only be partially achieved by normal couplings.

Some typical drive line arrangements for two wheel drive, part-time four wheel drive, permanent four wheel drive (all wheel drive) with center differential, and permanent four wheel drive (all wheel drive) with coupling, will be described below.

In a typical two wheel drive vehicle, which may be front wheel drive or rear wheel drive, torque from the transmission is applied to the wheels on one axle, through a differential. Slip results, which causes a drive force. The net drive force is limited to $(\mu)*F_N$ at the drive axle. There is no problem with the inter-axle speed differences in cornering since there is no connection between axles.

In a part-time four wheel drive system, the system may be operated in two wheel drive as described above, with all power going to the primary axle. The secondary axle also has a differential, but in this mode its input is disconnected. When the four wheel drive is engaged, a dog clutch or other locking device provides power to the secondary axle, via a propeller shaft. The axles are locked together, and must rotate at the same speed. Since the axle speeds are equal, when driving in a straight line, the slip at each axle is equal. Drive force therefore is $(\mu)*F_{NF}$ at the front and $(\mu)*F_{NR}$ at the rear. Drive force distribution (i.e. torque distribution) to the front axle is therefore $F_{NF}/(F_{NR}+F_{NF})$ under normal circumstances (both axles on the same surface). Axle speeds being equal forces binding slip at the tires when operated in turns, which is particularly problematic on medium and high ($\mu$) surfaces, therefore four wheel drive mode may not be suitable for use on these surfaces.

In permanent four wheel drive (all wheel drive) with a center differential, torque is applied to both axles at a distribution determined by the center differential. In a conventional coupling, torque is transmitted from the faster to the slower side only. This type of system is suitable for use on all surfaces since the axles are not locked together.

In a permanent four wheel drive (all wheel drive) system with a coupling, torque is applied directly to one axle (primary axle), and torque may be applied to the secondary axle through a coupling. Passive couplings, such as viscous couplings, typically react only to wheel slip and cannot be predictively applied (such as in advance of large drive torque). Torque distribution varies, but is not externally controllable independently of wheel speed or weight distribution. Controlled (active) couplings have the advantage of giving some external control of torque distribution, and they can be predictively applied to limit excessive wheel slip at the primary axle.

There are several advantages to a controlled coupling all wheel drive system compared to a center differential system. The controlled coupling all wheel drive system provides some ability to control the torque distribution between axles. This can be used to adjust the vehicle's response to surface conditions, and to some extent, to control oversteer and understeer.

In the case that the drive line path to the secondary axle is less efficient than the path to the primary axle, there is a theoretical fuel efficiency gain in limiting the torque transferred to the secondary axle. For example, in a typical transverse engine front wheel drive/all wheel drive vehicle with a transaxle, the drive line path to the front axle has no hypoid bevel gears (these typically dissipate 2–3% of the torque through them as heat). The torque to the rear axle must go through two sets of hypoid bevel gears, and is therefore much less efficient. If a center differential is used, then some torque is always diverted from the front axle to the rear axle, via a less efficient drive line. With a controlled coupling, it is possible to limit the conditions under which torque is sent to the rear axle, reducing the torque to nearly zero when the vehicle does not need the added traction. This improves overall efficiency by reducing the average torque through the less efficient drive line.

To provide all or nearly all torque to one axle (e.g. in the case that the other axle is on a low ($\mu$) surface or in the air), center differential based all wheel drive systems must have a supplementary locking device, which adds cost.

In vehicles with a transaxle (integrated transmission and axle differential), a center differential system requires interruption of the existing torque path, inside the transmission, to insert the center differential. A controlled coupling all wheel drive system provides power to the secondary axle from the differential input to the primary axle, without requiring an interruption of the existing gear train.

In a controlled coupling all wheel drive system, the torque to the secondary axle is controlled by the clutch, so long as the clutch is slipping (even very slightly, as is normally the case). As more torque is applied to the secondary axle, it develops more slip, and the primary axle develops less slip. When the slip at the two axles is equal, the speed across the clutch is equal, and the clutch is locked. In this condition, the torque applied to the clutch, beyond what it takes to lock it, provides no additional torque to the secondary axle. With axle slips equal, the torque distribution is simply the ratio of $F_{NS}/(F_{NP}+F_{NS})$ (as in the case of the part-time four wheel drive system). Thus there is an absolute limit: when both axles are on the same surface, it is not possible to send more torque to the secondary axle than defined by the ratio of normal forces. For example, a transverse, front engine all wheel drive car or sport-utility vehicle typically has about 55–60% of its weight on the front axle. Under acceleration, a few percentage points will shift to the rear. Using the front axle as primary, it is not possible to send more than approximately 50% of the torque to the rear. This limits the usefulness of torque control.

Further, in a controlled coupling all wheel drive system, if the vehicle has the rear axle as the primary, and the front axle is steered, then under tight cornering, it is impossible to send torque to the front axle with forcing slip at the rear axle. This is because the front axle's free-rolling speed exceeds that of the rear axle due to the path of the wheels. The amount of slip that must be forced on the rear axle is a function of the vehicle's wheel base and the inverse of the turn radius. In tight turns, it can be substantial (around 30%—more than the slip required for peak ($\mu$).

Vehicles typically have one or two propeller shafts to bring power to the axle differentials. The hypoid bevel gearing which connects the input (propeller) shaft to the differential has a non-unity gear ratio, often in the range of 2.5–4.5 (revolutions of the propeller shaft to revolutions of the differential housing). This is called the axle ratio. The primary and secondary axle ratios are defined as the revolution ratios between the respective propeller shaft(s) and the respective differential housings.

In the preceding descriptions of various all wheel drive systems, the assumption was made that the front and rear axle ratios were equal. This means that when the coupling was locked the axles would rotate at the same speed. In production all wheel drive vehicles, the axle ratios are always equal or nearly so.

If the primary axle ratio is higher than the secondary axle ratio, it is possible for a controlled coupling system to overcome the limitations on torque distribution described above. The ratio of axle ratios, primary/secondary, will be referred to as the overspeed ratio, since it represents how much faster the input to the coupling is spinning compared to the output, under free-rolling straight ahead conditions.

An overspeed ratio of around 1.2 allows up to 100% torque to the secondary axle under normal driving (equal front and rear ($\mu$), straight path). This overcomes the fundamental limitation in current controlled coupling all wheel drive systems described above. In order to transfer up to 100% torque to the secondary axle, the overspeed ratio must be set to force at least 20% more slip on the secondary axle (refer to FIGS. 2–4). In the case of a rear wheel drive based vehicle with a controlled coupling to the front axle, and with front wheel steer, a still higher overspeed ratio would overcome the additional rear axle slip required to transfer torque to the front axle while cornering.

The reason that no production all wheel drive vehicle uses a large, constant difference in axle ratios with an overspeed ratio is that there is a large power loss in many normal circumstances. For example, when the vehicle is on a slick surface for a prolonged time, such as a normal drive in the snow, the vehicle would need torque at both axles (likely, close to equal torque for traction and stability). To accomplish this with a 1.2 overspeed ratio, the coupling would dissipate about 20% of the secondary axle power as heat. Besides the excess fuel consumption, the heat buildup on the coupling would exceed the capacity of normal designs. Essentially, large overspeed ratios (e.g. 1.2) are unsuitable for continuous torque transfer due to efficiency and coupling durability.

Improved System for All Wheel Drive Vehicles

The invention provides selectable overspeed gearing, such as in an on-demand drive module for an all wheel drive vehicle. It effectively provides two axle ratios at the secondary axle, enabling both very efficient sustained torque transfer when the overspeed ratio is 1, and temporarily a very high torque distribution to the secondary axle when the overspeed ratio is greater than or equal to approximately 1.2. This allows the system to completely control the torque distribution, from 100% front to 100% rear drive, giving greater range of control of the vehicle dynamics (yaw response and stability). It allows, for example, rear biased handling in a transverse front engine vehicle with a transaxle, and does not require a center differential to do so. In addition, the system is fully controllable to allow the handling characteristics to suit the driver and conditions.

Figure 5:
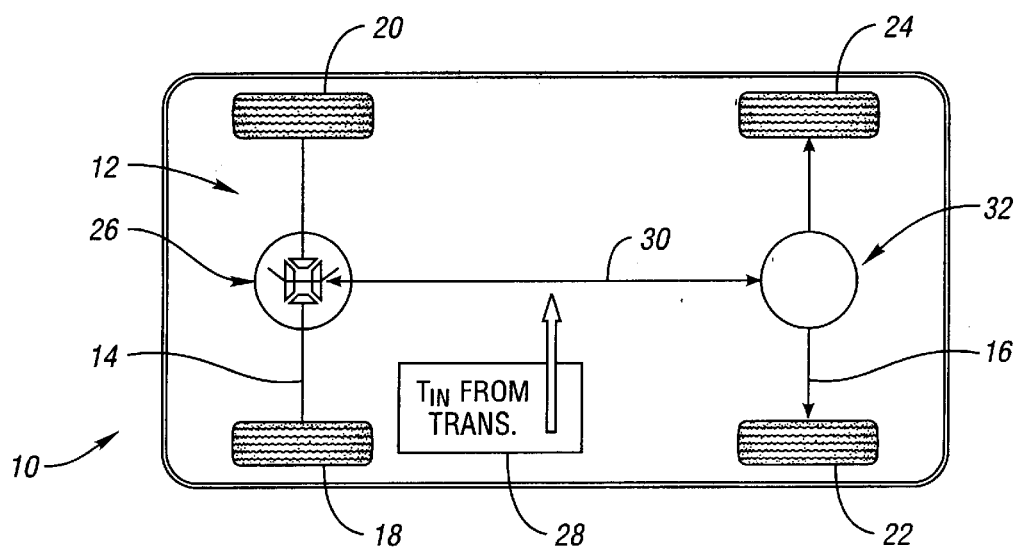
FIG. 5 shows a schematic overhead plan view of a vehicle drive system in accordance with a first embodiment of the invention.

FIG. 5 shows a diagram of a vehicle 10 including a drive system 12 in accordance with the invention. The drive system 12 includes primary and secondary axles 14, 16, each having left and right wheels 18, 20, 22, 24. The primary axle 14 includes a primary axle differential 26.

Figure 6:
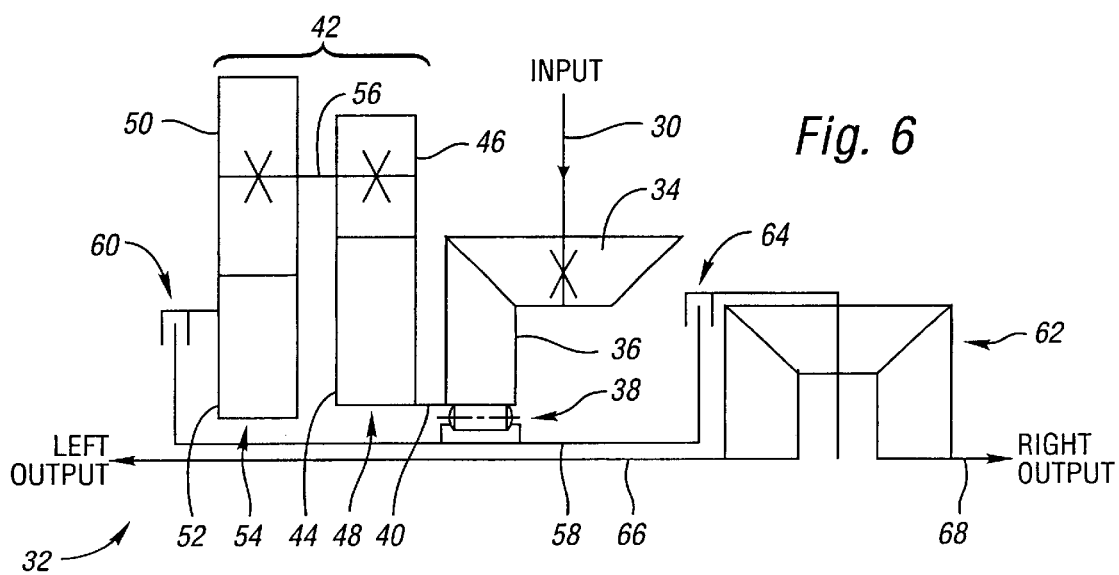
FIG. 6 shows a schematic powerflow diagram of a secondary axle drive module corresponding with FIG. 5.

As shown in FIG. 5, torque is provided from the transmission 28 to the output shaft (or propeller shaft) 30, and to the primary axle differential 26. The drive system 12 also includes a secondary axle drive module 32. The secondary axle drive module 32 is shown in greater detail in FIG. 6. In this embodiment, the secondary axle drive module 32 receives input torque from the output or propeller shaft 30 into an angle gear set 34, 36. The bevel gear 34 is fixed to the output shaft 30, and the bevel gear 36 is engaged with the one-way clutch 38 and connected via the connector 40 to the overspeed gear set 42. The overspeed gear set 42 includes first and second intermeshed gears 44, 46 forming a first subset 48, and third and fourth intermeshed gears 50, 52 forming a second subset 54. FIG. 6 shows, schematically, half of gears 44, 52 and 36 and all of gears 46 and 50, in cross-section.

The first gear 44 is connected to the bevel gear 36 through the connector 40, and intermeshed with the second gear 46. The second gear 46 is affixed to the third gear 50 through the interconnecting member 56.

The fourth gear 52 is intermeshed with the third gear 50 and is selectively engageable with the main shaft 58 through the overspeed clutch 60.

The first, second, third, and fourth gears 44, 46, 50, 52 are sized and arranged so that the fourth gear 52 rotates approximately 20% faster than the first gear 44.

The main shaft 58 is selectively engageable with the secondary axle differential 62 through the axle clutch 64. From the secondary axle differential 62, torque is carried to the left and right outputs 66, 68, which carry torque to the respective wheels 22, 24 shown in FIG. 5.

The secondary axle drive module 32 shown in FIG. 6 may be installed at the secondary drive axle of a two axle vehicle.

The output or propeller shaft 30 is connected to a power take-off unit from the primary axle or transmission output. The clutches 60, 64 are controlled by a vehicle control system to effect torque transfer to the secondary axle as appropriate.

Under normal driving conditions, the overspeed clutch 60 is open, and the main shaft 58 is driven by the one-way clutch 38 on the angle gear set 34, 36. The main shaft 58 speed is then equal to (or very close to) the primary axle speed. The axle clutch 64 is progressively applied as appropriate to transfer torque to the secondary axle differential 62. The secondary axle differential 62 then applies torque to the outputs 66, 68.

When it is desirable to provide added torque to the secondary axle, the overspeed clutch 60 is applied, causing the main shaft 58 to spin faster than the primary axle. The axle clutch 64 is progressively applied as appropriate to transfer torque to the secondary axle differential 62. Torque can be transferred to the secondary axle even when its wheels are spinning faster than the primary axle. The tires on the secondary axle can be forced to higher longitudinal slip than those on the primary axle. Also, it may be necessary to apply the overspeed clutch when the vehicle requires drive torque to the secondary axle in reverse.

As used herein, the terms primary and secondary axle may refer to a front axle or rear axle, depending upon the specific system and implementation.

Figure 7:
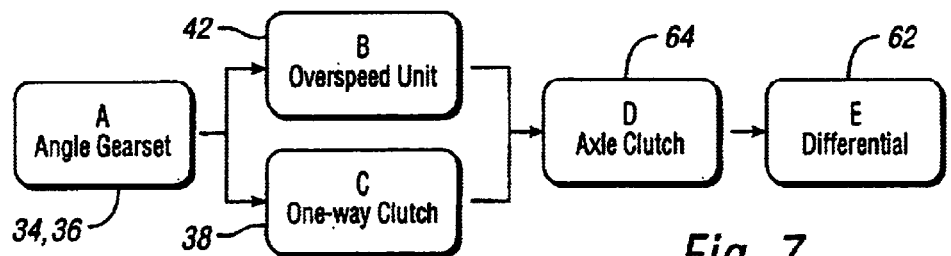
FIG. 7 shows a schematic torque flow diagram corresponding with FIG. 6.

Accordingly, the above described system provides selectable overspeed gearing on the secondary axle axis. There are alternative equivalent mechanizations as well. The functional blocks may be grouped as follows: group A—angle gear set 34, 36; group B—overspeed gear set 42; group C—one-way clutch 38; group D—axle clutch 64; and group E—secondary axle differential 62. The torque flow diagram for this embodiment is shown in FIG. 7.

Figure 8:
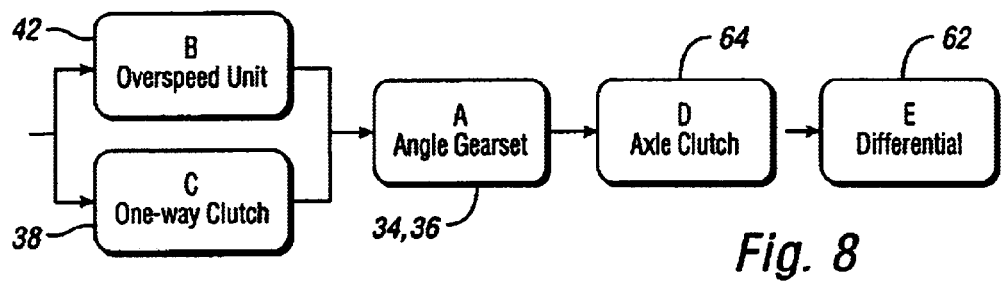
FIG. 8 shows an alternative schematic torque flow diagram.

Functionally, the order of these elements is not important, so long as groups B and C are installed in parallel. Thus, for this embodiment, there are six equivalent mechanizations (A, B–C, or D at the input, followed by one of the other two elements, followed by the last one). One equivalent mechanization is shown in FIG. 8, wherein the overspeed gear set 42 and one-way clutch 38 are positioned (in parallel) first sequentially, the angle gear set 34, 36 is second, the axle clutch 64 follows, and the differential 62 follows the axle clutch 64.

Figure 9:
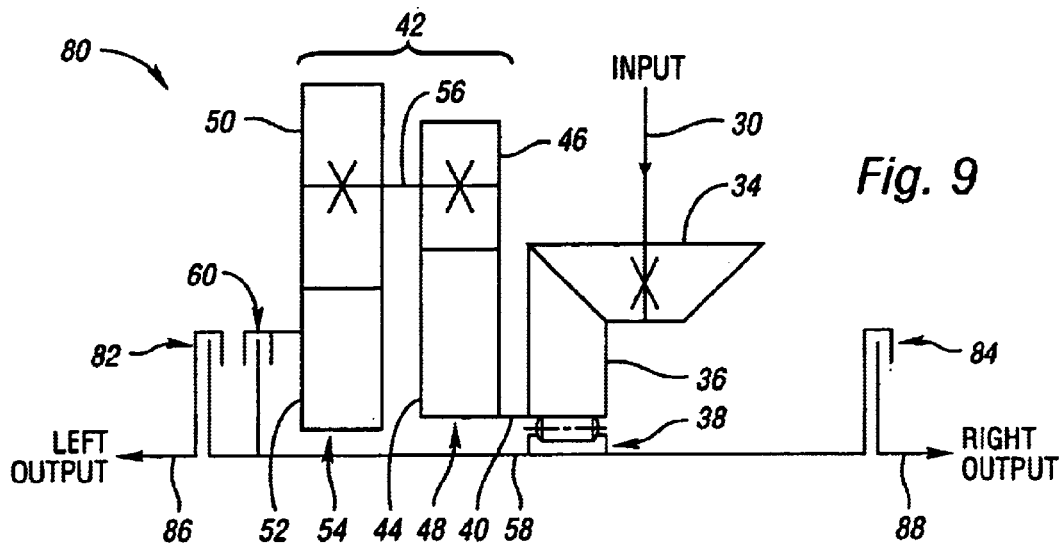
FIG. 9 shows a schematic powerflow diagram for a secondary axle drive module in accordance with a second embodiment of the invention.

Referring to FIG. 9, a schematic power flow illustration is provided in accordance with a second embodiment of the invention. In this embodiment, wherein like reference numerals are used to describe like components from FIG. 6, the secondary axle differential 62 shown in FIG. 6 is replaced with the left and right clutches 82, 84.

The secondary axle drive module 80 receives input torque from the output or propeller shaft 30 into an angle gear set 34, 36. The bevel gear 34 is fixed to the output shaft 30, and the bevel gear 36 is engaged with the one-way clutch 38 and connected via the connector 40 to the overspeed gear set 42. The overspeed gear set 42 includes first and second intermeshed gears 44, 46 forming a first subset 48, and third and fourth intermeshed gears 50, 52 forming a second subset 54. FIG. 9 shows, schematically, half of gears 44, 52 and 36 and all of gears 46 and 50, in cross-section.

The first gear 44 is connected to the bevel gear 36 through the connector 40, and intermeshed with the second gear 46. The second gear 46 is affixed to the third gear 50 through the interconnecting member 56.

The fourth gear 52 is intermeshed with the third gear 50 and is selectively engageable with the main shaft 58 through the overspeed clutch 60.

The mainshaft 58 is selectively engageable with the left and right outputs 86, 88 through the left and right clutches 82, 84, respectively. The outputs 86, 88 drive the left and right wheels.

Figure 10:
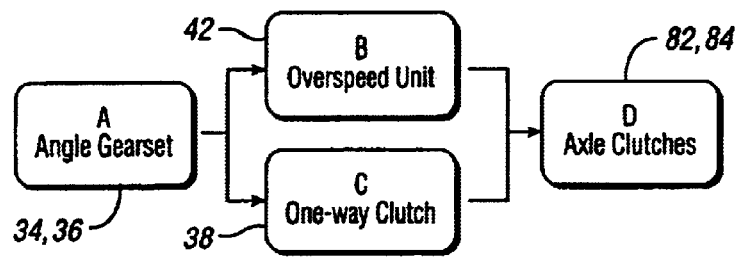
FIG. 10 shows a schematic torque flow diagram corresponding with the embodiment of FIG. 9.

As described previously with respect to FIG. 6, the clutches 60, 82, 84 are controlled by a vehicle control system to effect torque transfer to the secondary axle and to the left and right outputs 86, 88. The left and right clutches 82, 84 are applied as appropriate to transfer torque to the outputs 86, 88. The functional blocks of the components shown in FIG. 9 may be grouped as follows: group A—angle gear set 34, 36; group B—overspeed gear set 42; group C—one-way clutch 38; and group D—axle clutches 82, 84. A flow schematic of these grouped functional blocks is shown in FIG. 10. In this case, another equivalent mechanization would be to swap the location of group A and groups B–C.

While the best modes for carrying out the invention have been described in detail, those familiar with the art to which this invention relates will recognize various alternative designs and embodiments for practicing the invention within the scope of the appended claims.

What is claimed is:

1. A vehicle drive system comprising:
   a primary axle driven by torque from a transmission;
   an output shaft driven by the primary axle or transmission;
   a secondary axle;
   a secondary axle clutch configured to operatively connect the secondary axle with the output shaft; and
   a secondary axle drive module operatively connected between the output shaft and secondary axle, said drive module including an overspeed gear set connected in parallel with a one way clutch to facilitate application of torque to the secondary axle even when the secondary axle is rotating faster than the primary axle.

2. The vehicle drive system of claim 1, wherein said overspeed gear set is selectively engageable with the secondary axle through an overspeed clutch.

3. The vehicle drive system of claim 1, further comprising a secondary axle differential operatively engaged between the secondary axle drive module and the secondary axle.

4. The vehicle drive system of claim 1, further comprising an angle gear set operatively connected between the output shaft and the drive module.

5. The vehicle drive system of claim 4, wherein said overspeed gear set includes first and second intermeshed gears forming a first subset and third and fourth intermeshed gears forming a second subset, wherein the first gear is connected to the angle gear set, the second gear is affixed to the third gear, and the fourth gear is selectively engageable with the secondary axle through an overspeed clutch, said first, second, third and fourth gears being sized so that the fourth gear rotates faster than the first gear.

6. The vehicle drive system of claim 1, further comprising left and right clutches on the secondary axle to selectively engage and disengage left and right wheels.

7. The vehicle drive system of claim 1, further comprising an angle gear set operatively connected between the output shaft and the secondary axle, and wherein the angle gear set, drive module, and secondary clutch may be arranged in any order sequentially in a torque flow path between the output shaft and secondary axle.

8. The vehicle drive system of claim 1, wherein said secondary axle drive module enables torque distribution adjustment between 100% primary axle drive and 100% secondary axle drive.

9. The vehicle drive system of claim 1, wherein said overspeed gear set is configured to selectively rotate the secondary axle approximately 20% faster than the primary axle.

10. A secondary axle drive system configured for use in a vehicle having a primary axle and a longitudinal propeller shaft, the secondary axle drive system comprising:
    a secondary axle;
    a secondary axle clutch configured to operatively connect the secondary axle with the propeller shaft; and
    a secondary axle drive module operatively connected between the propeller shaft and secondary axle, said drive module including an overspeed gear set connected in parallel with a one-way clutch to facilitate selective application of torque to the secondary axle even when the secondary axle is rotating faster than the primary axle.

11. The secondary axle drive system of claim 10, wherein said overspeed gear set is selectively engageable with the secondary axle through an overspeed clutch.

12. The secondary axle drive system of claim 10, further comprising a secondary axle differential operatively engaged between the secondary axle drive module and the secondary axle.

13. The secondary axle drive system of claim 10, further comprising an angle gear set operatively connected between the propeller shaft and the drive module.

14. The secondary axle drive system of claim 13, wherein said overspeed gear set includes first and second intermeshed gears forming a first subset and third and fourth intermeshed gears forming a second subset, wherein the first gear is connected to the angle gear set, the second gear is affixed to the third gear, and the fourth gear is selectively engageable with the secondary axle through an overspeed clutch, said first, second, third and fourth gears being sized so that the fourth gear rotates faster than the first gear.

15. The secondary axle drive system of claim 10, further comprising left and right clutches on the secondary axle to selectively engage and disengage left and right wheels.

16. The secondary axle drive system of claim 10, further comprising an angle gear set operatively connected between the propeller shaft and the secondary axle, and wherein the angle gear set, drive module, and secondary clutch may be arranged in any order sequentially in a torque flow path between the propeller shaft and secondary axle.

17. The secondary axle drive system of claim 10, wherein said secondary axle drive module enables torque distribution adjustment between 100% primary axle drive and 100% secondary axle drive.

18. The secondary axle drive system of claim 10, wherein said overspeed gear set is configured to selectively rotate the secondary axle approximately 20% faster than the primary axle.

19. A vehicle drive system comprising:
    a primary axle driven by torque from a transmission;
    an output shaft driven by the primary axle or transmission;
    a secondary axle;
    a secondary axle clutch configured to operatively connect the secondary axle with the output shaft;
    a secondary axle drive module operatively connected between the output shaft and secondary axle, said drive module including an overspeed gear set connected in parallel with a one-way clutch to facilitate selectively rotating the secondary axle faster than the primary axle so that greater torque is applied at the secondary axle than the primary axle;

an angle gear set operatively connected between the output shaft and the drive module; and said overspeed gear set including first and second intermeshed gears forming a first subset and third and fourth intermeshed gears forming a second subset, wherein the first gear is connected to the angled gear set, the second gear is affixed to the third gear, and the fourth gear is selectively engageable with the secondary axle through an overspeed clutch, said first, second, third and fourth gears being sized so that the fourth gear rotates faster than the first gear.

20. The vehicle drive system of claim 19, wherein said secondary axle drive module enables torque distribution adjustment between 100% primary axle drive and 100% secondary axle drive, and wherein said overspeed gear set is configured to selectively rotate the secondary axle approximately 20% faster than the primary axle.

* * * * *